US011911923B2

(12) United States Patent
Panosian et al.

(10) Patent No.: US 11,911,923 B2
(45) Date of Patent: Feb. 27, 2024

(54) ERGONOMIC DUAL MODE SNIPS

(71) Applicant: TOUGHBUILT INDUSTRIES, INC., Lake Forest, CA (US)

(72) Inventors: Michael H. Panosian, Irvine, CA (US); Joshua Keeler, Lake Forest, CA (US)

(73) Assignee: TOUGHBUILT INDUSTRIES, INC., Lake Forest, CA (US)

(*) Notice: Subject to any disclaimer, the term of this patent is extended or adjusted under 35 U.S.C. 154(b) by 0 days.

(21) Appl. No.: 16/916,966

(22) Filed: Jun. 30, 2020

(65) Prior Publication Data

US 2021/0402627 A1 Dec. 30, 2021

(51) Int. Cl.

| | |
|---|---|
| ***B26B 13/12*** | (2006.01) |
| ***B25G 1/10*** | (2006.01) |
| ***B26B 13/20*** | (2006.01) |
| ***B26B 13/26*** | (2006.01) |

(52) U.S. Cl.

CPC .............. *B26B 13/12* (2013.01); *B25G 1/102* (2013.01); *B26B 13/20* (2013.01); *B26B 13/26* (2013.01)

(58) Field of Classification Search

CPC ......... B26B 13/12; B26B 13/14; B26B 13/20; B26B 13/26; B25G 1/102

USPC ......... 30/190, 191, 232, 251, 252; D8/5, 52, D8/107

See application file for complete search history.

(56) References Cited

U.S. PATENT DOCUMENTS 2,436,260 A * 2/1948 Klenk ...................... A01G 3/02 30/252
2,535,215 A * 12/1950 Klenk ..................... A61M 3/00 30/251
3,587,173 A * 6/1971 Hexdall ............... B23D 29/026 30/251
4,439,923 A * 4/1984 Scranton ................ B26B 13/26 30/252

(Continued)

FOREIGN PATENT DOCUMENTS

EP 0228659 7/1987
EP 3290169 A1 3/2018

OTHER PUBLICATIONS

Milwaukee 11.5 in. Long Straight-Cut Aviation Snips-48-22-4537—The Home Depot PA-08 11.5 in. Long Straight-Cut Aviation Snips.

(Continued)

*Primary Examiner* — Jason Daniel Prone

(74) *Attorney, Agent, or Firm* — Nolte Lackenbach Siegel; Myron Greenspan

(57) ABSTRACT

Ergonomic snips have a pair of pivoted levers each having a forward end formed as a cutting blade and a rearward end forming a hand portion. A first handgrip on one hand portion includes a first anti-slip ear suitable for engaging a user's thumb. A second handgrip on the other hand portion includes a second anti-slip ear to form a finger receiving portion to accommodate one or both of the index and middle fingers of a user to allow a user to either place the second anti-slip ear between the user's index and middle fingers to maximize torque or place the second anti-slip ear between said middle and ring fingers to provide greater cutting control or precision. The distances between a user's thumb and the user's index and middle fingers remain substantially the same in both positions of the hand.

12 Claims, 3 Drawing Sheets

(56) References Cited

U.S. PATENT DOCUMENTS

| | | | | | |
|---|---|---|---|---|---|
| 4,463,497 | A | | 8/1984 | O'Keeffe | |
| 4,502,222 | A | * | 3/1985 | Sargent | B26B 13/12 30/251 |
| 4,569,131 | A | * | 2/1986 | Falk | A61B 17/3201 30/251 |
| 4,569,132 | A | | 2/1986 | Hill | |
| 4,967,475 | A | * | 11/1990 | O'Keeffe | B26B 13/26 30/252 |
| 5,003,695 | A | | 4/1991 | Lipscomb et al. | |
| 5,119,561 | A | | 6/1992 | Olds | |
| 5,279,034 | A | * | 1/1994 | Smith | B26B 13/12 30/232 |
| 5,463,814 | A | * | 11/1995 | Stowell | B26B 13/12 30/232 |
| D369,534 | S | * | 5/1996 | Liou | D8/52 |
| D416,456 | S | * | 11/1999 | Pomeroy | D8/52 |
| D418,030 | S | * | 12/1999 | Khachatoorian | D8/52 |
| D421,207 | S | * | 2/2000 | Panier | D8/52 |
| 6,088,920 | A | * | 7/2000 | Schmick | B23D 29/023 30/193 |
| 6,134,994 | A | | 10/2000 | Gomas | |
| D449,768 | S | * | 10/2001 | Salazar | D8/52 |
| 6,574,870 | B1 | | 6/2003 | Huang | |
| D477,208 | S | * | 7/2003 | Panosian | D8/107 |
| D484,771 | S | * | 1/2004 | Panosian | D8/107 |
| D503,081 | S | | 5/2005 | Lucas et al. | |
| D523,709 | S | * | 6/2006 | Knox | D8/5 |
| D528,380 | S | * | 9/2006 | Sue | D8/5 |
| 7,346,991 | B1 | | 3/2008 | Janson | |
| D618,078 | S | * | 6/2010 | Cripps | D8/52 |
| 7,730,811 | B2 | * | 6/2010 | Robinson | B26B 13/26 81/423 |
| D631,322 | S | * | 1/2011 | Wong | D8/107 |
| D663,175 | S | * | 7/2012 | Steinhobel | D8/5 |
| 8,316,549 | B2 | | 11/2012 | Musser | |
| D699,526 | S | * | 2/2014 | Wang | D8/5 |
| D708,037 | S | | 7/2014 | Anderson et al. | |
| 9,089,978 | B2 | * | 7/2015 | Carmichael | B26B 13/26 |
| D773,267 | S | * | 12/2016 | Yen | D8/52 |
| D775,504 | S | * | 1/2017 | Dechant | D8/52 |
| 10,136,583 | B2 | | 11/2018 | Dechant et al. | |
| 10,611,040 | B2 | * | 4/2020 | Huang | B26B 13/26 |
| D894,712 | S | * | 9/2020 | Panosian | D8/107 |
| 2002/0138990 | A1 | * | 10/2002 | Gluck | B26B 13/26 30/254 |
| 2006/0137192 | A1 | * | 6/2006 | Deter | B26B 13/26 30/248 |
| 2012/0304473 | A1 | * | 12/2012 | Panosian | B26B 17/02 30/192 |
| 2013/0160301 | A1 | * | 6/2013 | Huang | B26B 13/26 30/252 |
| 2014/0298661 | A1 | | 10/2014 | Carmichael et al. | |
| 2016/0185000 | A1 | | 6/2016 | Huang | |
| 2016/0263753 | A1 | * | 9/2016 | Takahashi | B26B 13/20 |
| 2018/0056409 | A1 | * | 3/2018 | Caglar | B26B 13/12 |
| 2018/0272548 | A1 | | 9/2018 | Schneider | |

OTHER PUBLICATIONS

Klein Tools Straight-Cut Aviation Snips with Wire Cutter-1202S—The Home Depot PA-09 Straight-Cut Aviation Snips with Wire Cutter.
Stanley STA214563 Aviation Snip—Straight 2-14-563: Amazon.co.uk: DIY & Tools PA-010 Stanley STA214563 Aviation Snip—Straight 2-14-563.
Dewalt Aviation Snips PA-011 DWHT70278—3 PK Aviation Snips.
Grupo Urrea Total Solutions in Tools PA-012 Multi-Purpose Aviation Snips.
Craftsman Evolv 3 pc. Aviation Snip Set: Amazon.com: Industrial & Scientific PA-013 Craftsman Evolv 3 pc. Aviation Snip Set.
Crescent Wiss 9-3/4" MetalMaster Compound Action Snips—Straight, Left and Right Cut—M3R—Nippers and Snips—Amazon.com https://www.PA-014 Crescent Wiss 9-3/4" MetalMaster Compound Action Snips—Straight, Left and Right Cut—M3R.
21182554.2 European Search Report, dated Oct. 13, 2021, 9 pages.

* cited by examiner

ERGONOMIC DUAL MODE SNIPS

BACKGROUND OF THE INVENTION

1. Field of the Invention

The present invention generally relates to hand tools and, more specifically, to ergonomic dual-mode snips.

2. Description of Background Art

Snips or shears are hand tools used to cut sheet metal and other tough sheet materials. Tinner's snips are two levers joined at a single pivot and are similar to common scissors. Compound action snips, also referred to as aviation snips, use a compound leverage handle system to increase the mechanical advantage to enable a user to cut harder sheet materials. Aviation snips, for example, can cut aluminum sheet up to 18 gauge, mild steel up to 24 gauge or stainless steel up to 26 gauge. Because the sheets or webs are generally hard they resist cutting and substantial forward or axial forces must be applied by a user in the cutting direction. Therefore, in addition to squeezing the handles of the snips together to close the cutting jaws or blades the user must also apply, as noted, significant forces along the axis of the tool in the cutting direction. To avoid slippage of the user's hands on the handles or handgrips when applying such axial forces the snips are normally provided with anti-slip ear portions, outwardly projecting protuberances or bulges on the grips. The fingers are placed behind these elements to prevent the hand from slipping along the handgrips when significant axial forces are applied. However, existing compound snips are configured and contemplate a single hand position or mode of operation during use in which the thumb of the user is positioned behind an anti-slip protuberance or projection on one handgrip while the other handgrip is provided with an anti-slip protuberance or projection that is arranged to be positioned between the users index and middle fingers. While the prior art configurations allow the user to apply the necessary forces on the handles without slipping, the resulting position of the hand is intended to maximize the squeezing forces or torque applied to the handles. Examples of such prior art snips include the following U.S. Pat. Nos. 4,463,497; 4,569,132; 5,003,695; 6,574,870; 7,346,991 and 10,136,583. See also U.S. Design Patent D503,081. However, in some cases it is desirable to advance the hand closer to the cutting jaws or blades to provide the user greater control while cutting with greater precision. Existing snips are, therefore, functionally dedicated to a single mode of use or operation in which the user is not accorded the option of multiple positions of the hand relative to the handgrips.

SUMMARY OF THE INVENTION

Accordingly, it is an object of the invention to provide snips that do not have the disadvantages of prior art snips, namely the lack of flexibility and range of movement of a user's hand to different positions relative to the pivot points of the tool.

It is another object of the invention to provide an ergonomic snips that is equally comfortable to the user irrespective of the mode of use or hand positions.

It is still another object of the invention to provide an ergonomic dual-mode snips as aforementioned that is simple in construction and economical to manufacture.

It is yet another object of the invention to provide snips that are easy and convenient to use.

It is a further object of the invention to provide snips that allows a user to apply greater forces or torques on the handles or handgrips when required, making it possible to cut harder sheet materials, while allowing a user to compromise some torque for greater control and cutting accuracy where precision cutting is required.

It is still a further object of the invention to provide handgrips for both tinner's as well as compound snips to provide the aforementioned advantages.

In order to achieve the above objects, as well as others that will become evident to those skilled in the art, ergonomic snips in accordance with the invention comprises:

(A) a pair of pivoted levers generally defining an axis of symmetry, each lever having a forward or leading end formed as a cutting blade and a rearward or trailing end forming a hand portion;

(B) pivoting means for pivoting said levers at a position intermediate said ends;

(C) a first handgrip covering one of said hand portions and including a first anti-slip ear or projection proximate to said pivoting means and generally extending in a direction away from said axis to form an anti-slip catch suitable for engaging a user's thumb; and (D) a second handgrip covering the other of said hand portions and including a second anti-slip ear or projection extending in a direction generally away from said axis and forming a finger gripping portion between said second anti-slip ear or projection and said pivoting means and generally having an axial length to accommodate one or both of the index and middle fingers of a user to allow a user to either place said second anti-slip ear or projection between the user's index and middle fingers in a first position of the hand to maximize torque on said hand portions or place said second anti-slip ear or projection between said middle and ring fingers in a second position of the hand to provide greater control or precision of cutting by said cutting blades, said levers being configured so that the distances between a user's thumb and the user's index and middle fingers remain substantially the same in both said first and second positions of the hand, whereby the snips ergonomically allows use of the snips with substantially equal comfort in both of said first and second hand positions while allowing a user to either apply greater cutting force or less cutting force but greater control to cut with greater precision.

A compound snips in accordance with the invention comprises:

(A) a pair of pivoted levers generally defining an axis of symmetry, each lever having a forward or leading pivoted end and a rearward trailing end forming a hand portion;

(B) first pivoting means for pivoting said levers together at said leading ends;

(C) a pair of complementary elongated blade levers each having opposing cutting blade and actuating ends, (D) second pivoting means for pivoting said blade levers to each other at intermediate ends thereof;

(E) third pivoting means for pivoting said actuating end of each blade lever to an associated handle lever;

(F) a first handgrip covering one of said hand portions and including a first anti-slip ear or projection proximate to said third pivoting means and generally extending in a direction away from said axis to form an anti-slip catch suitable for engaging a user's thumb; and (G) a second handgrip covering the other of said hand portions and including a second anti-slip ear or projection extending in a direction generally away from said axis and forming a finger gripping portion between said second anti-slip ear or projection and said third pivoting means and having a generally axial length to accommodate one or both of the index and middle fingers of a user to allow a user to either place said second anti-slip ear or projection between the user's index and middle fingers in a first position of the hand to maximize torque on said hand portions or place said second anti-slip ear or projection between said middle and ring fingers in a second position of the hand to provide greater control or precision of cutting by said cutting blades, said levers being configured so that the distances between a user's thumb and the user's index and middle fingers remain substantially the same in both said first and second positions of the hand, whereby the snip ergonomically allows a user to use the snip with substantially equal comfort in both of said first and second hand positions while allowing a user to apply greater cutting force or less cutting force but greater control to cut with greater precision.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION

Figure 1:
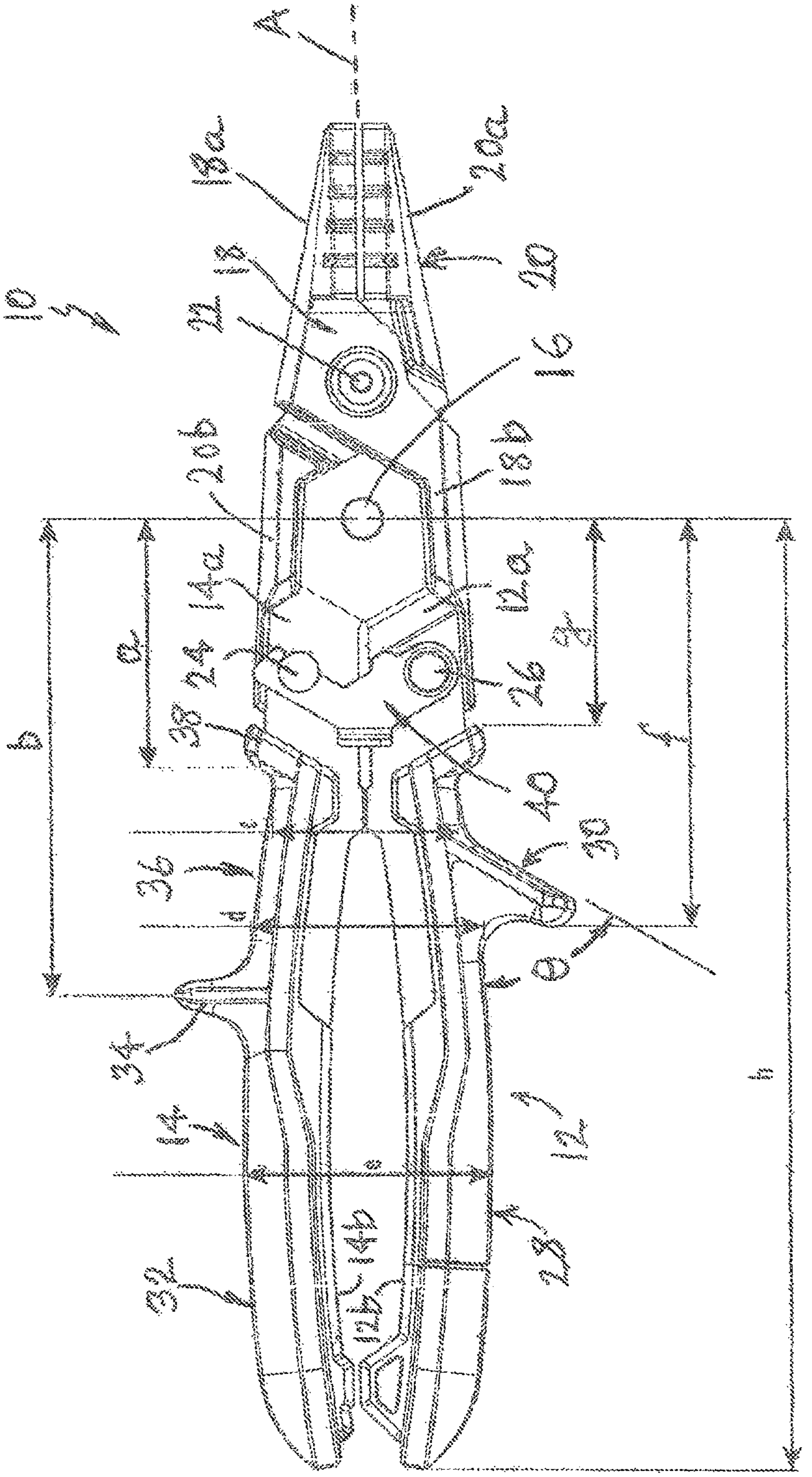
FIG. 1 is a side elevational view of a compound or multiplied leverage snips in accordance with the invention, shown in the condition when the cutting jaws or blades are closed.

Referring now specifically to the figures, in which the identical or similar parts are designated by the same reference numerals throughout, and first referring to FIG. 1, a pair of snips in accordance with the present invention is generally designated by the reference 10.

The snips 10 includes a pair of pivoted gripping levers 12, 14 that define an axis of symmetry A. Each gripping lever 12, 14 has a forward or pivoted end 12*a*, 14*a* and rearward or proximate ends 12*b*, 14*b* forming hand gripping portions. The gripping levers at 12, 14 are pivoted to each other at the forward or remote ends by a first pivot 16.

Figure 3:
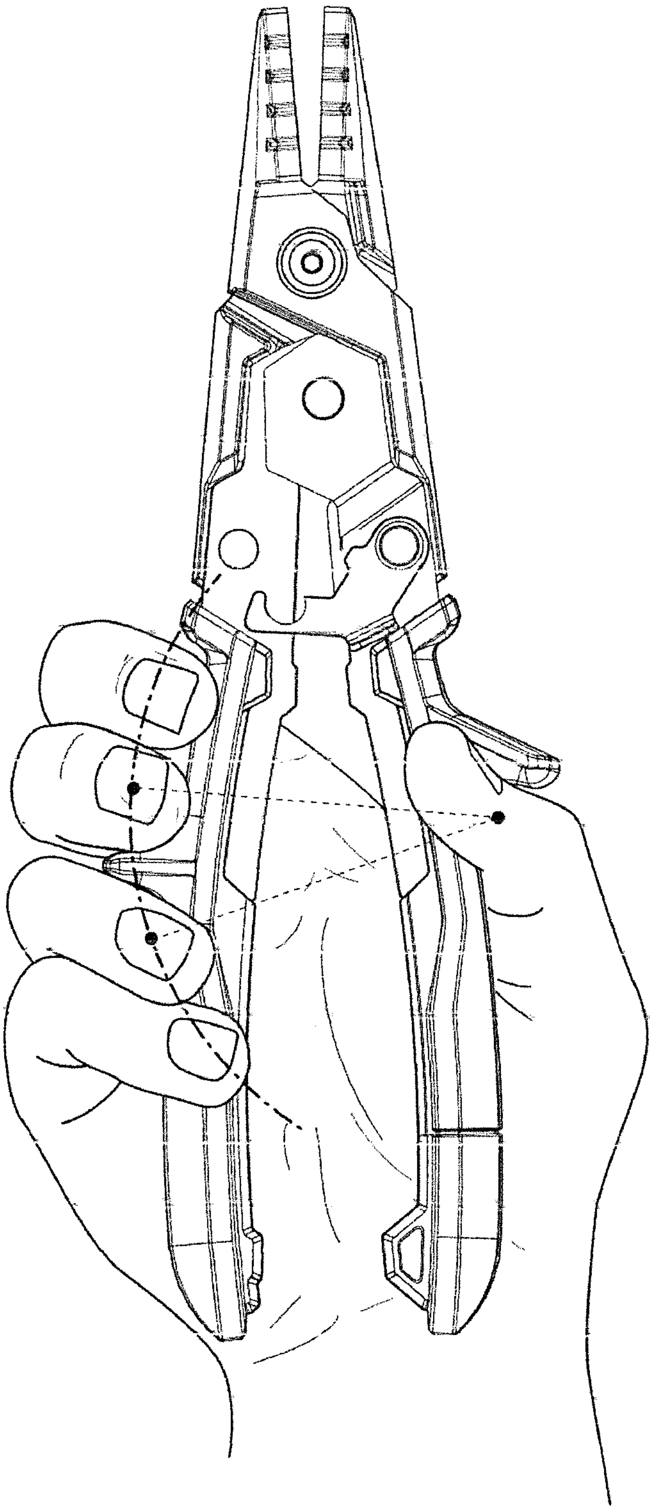
FIG. 3 is similar to FIG. 2 but shows a second mode of use of the snips wherein the user's hand has moved to an alternate or second position providing the user with less cutting torque but increased control for precision cutting.

Referring to FIG. 3, the hand can be advanced relative to the second anti-slip ear or projection 34 to bring the hand closer to the pivot 16 by placing the anti-slip ear or projection 34 to bring the hand closer to the pivot 16 by placing the anti-slip ear 34 between the middle finger 45 and the ring finger 48. This reduces the level arm and, therefore, reduces the amount of torque or cutting force that can be applied to the cutting blades. However, in this second position or mode of use of the snips, a user can achieve greater control and cutting precision.

Figure 2:
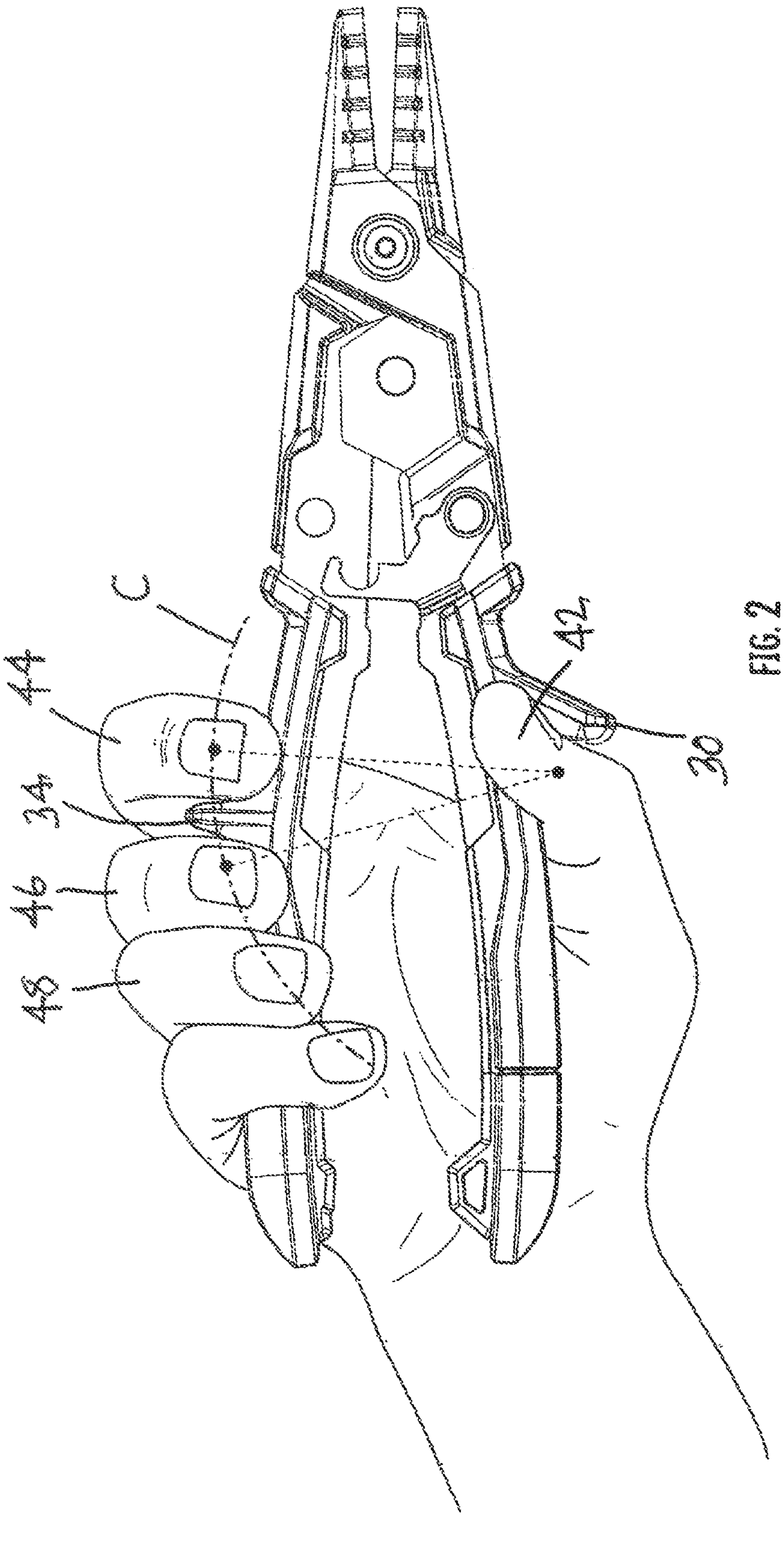
FIG. 2 shows a first mode of use of the snips shown in FIG. 1 in which a user's hand is placed in a first position to provide maximum cutting torque or power while somewhat sacrificing some control and cutting precision.

A conventional locking tab, lever or strap 40 is used to lock the snips in the closed position shown in FIG. 2.

A pair of complementary elongated blade levers 18, 20 each have opposing cutting blade ends 18*a*, 20*a* and actuating ends 18*b*, 20*b*. The elongated blade levers 18, 20 are pivoted to each other at intermediate ends thereof at a second pivot 22. Third and fourth pivots 24, 26 pivot the actuating ends 18*b*, 20*b* to associated handle gripping levers 12, 14.

A first handgrip 28 at least partially covers the rearward or proximate end 12*b* of the gripping lever 12. The first handgrip 28 may be formed of any conventional materials used for handgrips for such tools, including plastics, foam materials etc. The handgrip 28 includes a first anti-slip ear or projection 30 proximate to pivot 26 and generally extends in a direction away from the axis A to form an anti-slip catch or ear suitable for engaging a user's thumb 42 as shown in FIG. 2. In the embodiment shown in FIG. 1, the anti-slip ear or projection 30 has proximate point X and is inclined rearwardly as shown and forms an angle θ, no greater than 90 degrees, with respect to the generally axial direction parallel to the axis A.

A second handgrip 32 at least partially covers the rearward or proximate end 14*b* of the gripping lever 14. The second handgrip 32 includes a second anti-slip ear or projection 34 that extends in a direction generally away from the axis A and forms a finger receiving portion 36 between the second anti-slip ear or projection 34 and outwardly projecting protrusion 38 at the forward-most or remote end of the second handgrip 32. The finger receiving portion 36 has a generally axial length along the lever 14 to accommodate one or both of the index and middle fingers, 44, 46, respectively, of a user to allow a user to either place the anti-slip ear or projection 34 between the user's index and middle fingers 44, 46, respectively, in a first position of the hand as shown in FIG. 2 to maximize torque on the hand portions of the levers. Clearly, the further rearward that the hand is placed relative to the pivot 16 the greater the leverage and force that can be applied to the cutting or shear blades 18*a*, 20*a*.

The finger-receiving portion 36, along a direction of the axis A, is defined as the distance between the anti-slip ear or projection 34 and the protrusion 38 and has a predetermined length that is generally equal to "b−a". The anti-slip ear or projection 34 has a remote point Y while the protuberance 38 has a proximate point, defining between points Y and Z a generally flat region 36 along a straight line L1. As is clear from FIG. 1, the projection or ear 34 has a remote curved surface S2 facing into the finger receiving portion 36 while the protrusion 38 has a proximate curved surface S3 facing into the finger receiving portion, points Y and Z being located at the intersection points of surfaces S2 and S3 with L1, respectively. Similarly, the ear or projection 30 has a proximate curved surface S1 that intersects a generally flat surface along a straight line L2.

The first anti-slip ear or projection 30 is positioned along the axis so that its proximate point X is substantially aligned with the remote point Y of the second anti-slip ear or projection 34. Also, as indicated in FIG. 1, the generally flat region 36' between points Y and Z is approximately 72% of the predetermined length "b−a". Additionally, an axial distance D between the second anti-slip ear 34 and the protrusion 38 "b−a" is approximately equal to a distance E between points X and Y along a direction normal to the axis between the proximate point X on the first anti-slip ear 30 and the remote point Y on the second anti-slip ear.

Referring to FIG. 3, the hand can be advanced relative to the second anti-slip ear or projection 34 to bring the hand closer to the pivot 16 by placing the anit-slip ear 34 between the middle finger 46 and the ring finger 48. This reduces the lever arm and, therefore, reduces the amount of torque or cutting force that can be applied to the cutting blades. However, in this second position or mode of use of the snips, a user can achieve greater control and cutting precision.

A first handgrip 28 at least partially covers the rearward or trailing end 12*b* of the lever 2. The handgrip 28 may be formed of any conventional materials used for handgrips for such tools, including plastics, foam materials etc. The handgrip 28 includes a first anti-slip ear or projection 30 proximate to pivot 26 and generally extends in a direction away from the axis A to form an anti-slip catch suitable for engaging a user's thumb 42 as shown in FIG. 2. In the embodiment show in FIG. 1, the anti-slip ear or projection 30 is inclined rearwardly as shown and forms an angle θ, no greater than 90 degrees, with respect to a generally axial direction parallel to the axis A.

A feature of the invention is that the configuration of the levers and the positions of the anti-slip ears or projections 30, 34 are selected so that the distances between a user's thumb, which stays in a fixed position in both modes of operation, and the user's index and middle fingers remain substantially the same in both the first and second positions of the hand. In this way, the snips ergonomically allows a user to use the snip with substantially equal comfort in both of the operating modes or hand positions while allowing a user to either apply greater cutting force or less cutting force but greater control to cut with greater precision.

Referring to FIG. 1, the axial dimension between the first pivot 16 and the end of the finger receiving portion 36 is "a", the axial dimension between the first pivot 16 and the second anti-slip ear or projection is "b". The transverse dimensions between said first and second handgrips along a direction substantially normal to the axis A through the forward-most portion of the first anti-slip ear or projection 30 is "c". The transverse dimension along a direction substantially normal to the axis A at the rear-most portion of the first anti-slip ear or projection 30 is "d". The dimension $b \approx 2d$. Also, $a \approx d$ and $d > c$. In an exemplary embodiment "a" is equal to 46.5 mm, "b" is equal to 88.54 mm, "c" is equal to 34.36 mm and "d" is equal to 43.05 mm, "e" is equal to 38.31 mm, "f" is equal to 75.59 mm and "g" is equal to 46.00 mm. Accordingly, the dimension of the handgrip 32 finger receiving space 36, between the anti-slip ear or projection 34 and the protrusion 38, for accommodating one or both of the index and middle fingers 44, 46, is approximately 42 mm, but may be within the range of 39-45 mm.

The protrusion 38 and the second anti-slip ear or projection 34 are arranged, as indicated, to create the finger receiving portion 36 to accommodate the user's index and middle fingers. Preferably, the receiving space 36 is dimensioned to accommodate the user's index and middle fingers with little clearance so that both the second anti-slip ear or projection and the protrusion 38 serve and function to apply forces on the second handgrip along the axis A in the forward direction towards the cutting blade ends 18*a*, 20*a*.

With the construction in accordance with the invention, and referring to FIGS. 2 and 3, the second handgrip 32 generally forms an arc C to each side of the anti-slip ear or projection 34 with a center at a user's thumb. Such construction, especially when combined with the dimensions of the receiving space 36 it is possible for a user to use the snips in one of two different modes of operation, each with its benefits or advantages, as exemplified in FIGS. 2 and 3. Importantly, the user can move to either of the two hand positions easily and with equal comfort to render the tool ergonomic and highly functional.

While the embodiment shown in FIGS. 1-3 is a compound or multiplied leverage snips, or aviation snips, the invention can also be applied to simple or tinner's snips. The construction and the operation of the handgrips 12, 14 are essentially the same for any known snips, as the invention is primarily directed to the handgrip constructions and these can be used on any pliers, snips or the like with different degrees of advantage.

The foregoing is considered as illustrative only of the principles of the invention. Further modifications and changes will readily occur to those skilled in the art. The invention is not limited to the exact construction and operation shown and described, and accordingly, all suitable modifications and equivalents may be resorted to, falling within the scope of the invention.

The invention claimed is:

1. Ergonomic snips comprising:

(A) first and second elongate gripping levers, said gripping levers having leading ends and having trailing ends forming respective first and second hand gripping portions;

(B) first pivoting means for pivotally connecting said first and second gripping levers at said leading ends;

(C) first and second elongate blade levers each having a distal end formed as a cutting blade and a proximate actuating end;

(D) second pivoting means for pivotally connecting said first and second blade levers to each other at a point intermediate said distal cutting blade and proximate actuating ends, a line extending through said first and second pivoting means defining an axis of the snips;

(E) third pivoting means for pivotally connecting said proximate end of said first blade lever to said first gripping lever;

(F) fourth pivoting means for pivotally connecting said proximate end of said second blade lever to said second gripping lever;

(G) a first handgrip covering said first hand gripping portion of said first gripping lever and including a first anti-slip ear generally extending in a direction away from said axis and forming a proximate surface for engaging a user's thumb axially spaced from said first pivoting means a distance "f"; and (H) a second handgrip covering said second hand gripping portion of said second gripping lever and including a proximate second anti-slip ear generally extending in a direction away from said axis axially spaced a distance "b" from said first pivoting means, and also formed with an outwardly projecting protrusion at a leading end of said second handgrip covering spaced a distance "a", said second anti-slip ear and said protrusion being spaced from each other along said second handgrip covering to form an elongate finger-receiving portion, a transverse dimension between said finger receiving portion along a direction substantially normal to said axis to said proximate surface of said first anti-slip ear when said first and second hand gripping portions are in a closed configuration is "d", and $b \approx 2d$, $a \approx d$ and said finger receiving portion is equal to $(b-a)$.

2. An ergonomic snip as defined in claim 1, wherein $(b-a)$ is within the range of 39-45 mm.

3. An ergonomic snip as defined in claim 1, wherein $a = 46.5$ mm.

4. An ergonomic snip as defined in claim 1, wherein $b = 88.54$ mm.

5. An ergonomic snip as defined in claim 1, wherein d=43.05 mm.

6. An ergonomic snip as defined in claim 1, wherein f=75.59 mm.

7. An ergonomic snip as defined in claim 1, wherein (b−a)≈42 mm.

8. Ergonomic snips comprising:

(A) first and second elongate gripping levers, said gripping levers having leading ends and having trailing ends forming respective first and second hand gripping portions;

(B) first pivoting means for pivotally connecting said first and second gripping levers at said leading ends;

(C) first and second elongate blade levers each having a distal end formed as a cutting blade and a proximate actuating end;

(D) second pivoting means for pivotally connecting said first and second blade levers to each other at a point intermediate said distal cutting blade and proximate actuating ends, a line extending through said first and second pivoting means defining an axis of the snips;

(E) third pivoting means for pivotally connecting said proximate end of said first blade lever to said first gripping lever;

(F) fourth pivoting means for pivotally connecting said proximate end of said second blade lever to said second gripping lever;

(G) a first handgrip covering said first hand gripping portion of said first gripping lever and including a first anti-slip ear generally extending in a direction away from said axis and forming a proximate surface for engaging a user's thumb axially spaced from said first pivoting means a distance "f"; and (H) a second handgrip covering said second hand gripping portion of said second gripping lever and including a proximate second anti-slip ear generally extending in a direction away from said axis axially spaced a distance "b" from said first pivoting means, and also formed with an outwardly projecting protrusion at a leading end of said second handgrip covering spaced a distance "a", said second anti-slip ear and said protrusion being spaced from each other along said second handgrip covering to form an elongate finger-receiving portion, a transverse dimension between said finger receiving portion along a direction substantially normal to said axis to said proximate surface of said first anti-slip ear when said first and second hand gripping portions are in a closed configuration is "d", and b≈2d, a≈d and said finger receiving portion is equal to (b−a), and wherein (b−a) is within the range of 39-45 mm.

9. An ergonomic snip as defined in claim 8, wherein a=46.5 mm.

10. An ergonomic snip as defined in claim 8, wherein b=88.54.

11. An ergonomic snip as defined in claim 8, wherein d=43.05 mm.

12. An ergonomic snip as defined in claim 8, wherein f=75.59 mm.

* * * * *